United States Patent [19]
Davis

[11] 3,804,313
[45] Apr. 16, 1974

[54] TAPE DRIVE

[75] Inventor: Cecil J. Davis, West Chester, Pa.

[73] Assignee: Bridge Data Products Corporation, Philadelphia, Pa.

[22] Filed: June 3, 1970

[21] Appl. No.: 43,059

[52] U.S. Cl. .................... 226/49, 226/95, 226/113, 242/182
[51] Int. Cl. .................... B65b 17/20
[58] Field of Search .......... 226/49, 51, 95, 97, 113; 74/220, 404; 192/43, 41, 48.2, 48.6; 242/182

[56] References Cited

UNITED STATES PATENTS

| | | | |
|---|---|---|---|
| 3,112,473 | 11/1963 | Wicklund | 226/97 X |
| 3,266,691 | 8/1966 | Welsh | 226/97 |
| 3,319,748 | 5/1967 | Joyce | 192/48.2 X |
| 3,329,364 | 7/1967 | Brettell | 226/97 x |

*Primary Examiner*—Richard A. Schacher
*Attorney, Agent, or Firm*—Seidel, Gonda and Goldhammer

[57] ABSTRACT

A tape drive using a differential vacuum to impart forward velocity to the tape and a single capstan for governing and permitting selective movement of the tape in opposite directions by an A.C. synchronous motor. Direction change of the tape is achieved by a one-way brake supported by the tape capstan and an electromagnetic clutch.

10 Claims, 4 Drawing Figures

INVENTOR
CECIL J. DAVIS

BY

Seidel, Gonda & Goldhammer
ATTORNEYS

INVENTOR
CECIL J. DAVIS

BY
Seidel, Gonda & Goldhammer
ATTORNEYS

TAPE DRIVE

This invention relates to magnetic tape drives, and more particularly to a tape drive of the type wherein a single capstan is operable to govern the speed of the tape in forward and reverse directions and wherein the tape is driven by differential vacuum applied to the tape buffer loops.

Generally magnetic tape drives known heretofore are either of the single capstan or dual capstan drives. The single capstan tape drives basically comprise two tape buffer tension loops and a magnetic head assembly. The capstan is driven forward and in reverse by a servomotor that requires an elaborate and expensive feedback control system to maintain constant tape velocity for recording and playback.

Dual capstan tape drives are comprised of essentially the same assemblies with the exception of having two counterrotating capstans for forward drive and reverse drive. Each of these capstans is continuously driven. Forward or reverse driving is achieved by bringing a pinch roll into engagement with that capstan rotating in the desired direction. The dual capstan drive, while it is complex and provides more uniform tape velocity is more expensive than the single capstan tape drive.

Accordingly, it is an object of this invention to provide a single capstan tape drive having the advantages of a dual capstan tape drive.

It is a further object of this invention to provide a single capstan tape drive that uses differential vacuum in the tape buffer loops to drive the tape.

It is still a further object of this invention to provide a single capstan tape drive that is operable to drive the tape in a reverse direction by an A.C. synchronous motor.

It is another object of this invention to provide a single capstan tape drive which is operative to govern the forward velocity of the tape to a predetermined value which is determined by an A.C. synchronous motor.

It is another object of this invention to provide a single capstan tape drive that is operative to selectively drive the tape in forward and reverse directions.

Generally the invention includes means for driving intelligence bearing tape comprising supply means and takeup means, first and second vacuum chambers disposed intermediate said supply means and said takeup means, and means for creating unequal vacuums in said chambers to drive said tape in a first direction.

The invention also includes a tape capstan including a frame, first drive shaft means mounted for rotation in a first direction, second drive shaft means mounted to said frame for rotation in a second direction, said second drive shaft means being coaxial with said first drive shaft means and supporting said first drive shaft means, tape capstan means rotatably supported by said first drive shaft means, said tape capstan means including means operable to limit the speed of rotation of said tape capstan to the speed of rotation of said first drive shaft means when they rotate in the same direction, couplable means fixed to said second drive shaft means for rotation therewith, and means for selectively coupling said second drive shaft means and said tape capstan means to drive said tape capstan means in the same direction as said second drive shaft means.

Other objects and advantages of the herein-disclosed invention will be apparent and the consideration of the detailed description thereof which follows wherein.

Figures 1, 4:
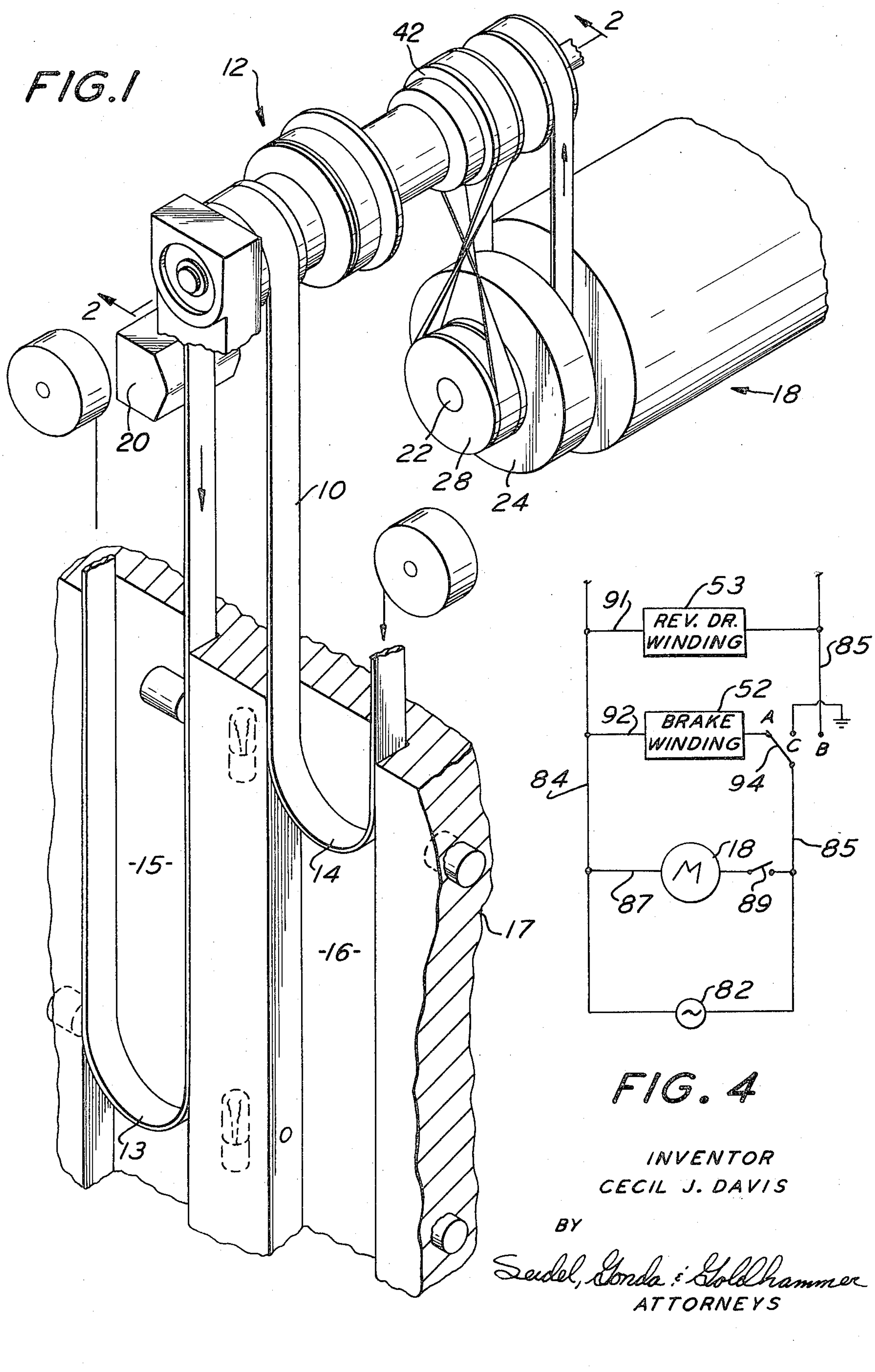
FIG. 1 is a perspective view of a single drive tape capstan constructed in accordance with the preferred form of the invention.
FIG. 4 is a schematic wiring diagram of the device illustrated in FIG. 1.

FIG. 1 illustrates the general arrangement of the tape drive system using the single capstan. A strip of magnetic tape 10 is rotatably supported by the capstan 12 for movement in forward and reverse directions. At either end of the tape are conventional supply and takeup reels. The tape has forward and reverse buffer tension loops 13 and 14 that are disposed in chambers 15 and 16 of a suitable source of vacuum 17.

The buffer tension loops function to drive the tape in the forward direction so that a separate drive capstan can be eliminated. Forward drive of the tape is achieved by applying different vacuum forces in each of the chambers 15 and 16 so that loop 14 is larger than loop 13. The vacuum force is proportional to the force in the tape. Thus, the larger loop 14 may correspond to a relatively large tensile force acting in the forward direction. The smaller loop 13 may correspond to a relatively small tensile force acting in the reverse direction. It should be understood, however, that the size of the loops is also controlled by the speed of the takeup and supply reels. Since the forward force is larger than the reverse force, the tape is driven in the forward direction. The vacuum in each of the chambers can be regulated to provide the correct differential vacuum to cause the tape to be driven in the desired direction. As will be clear from what follows the regulation of vacuum in the two chambers need not be controlled with precision. Thus, different size pumps or different size orifices can be employed to provide a suitable vacuum differential.

The capstan governs the velocity of the tape, thus obviating the need for precise control over the differential vacuum.

The capstan 12 is operatively connected to a synchronous motor 18 so that the magnetic tape is guided past playback or recording head 20. The synchronous motor 18 may be connected to the tape capstan by a suitable drive means that provides reliable transfer of power and speed without slip. A preferred means of interconnecting the capstan and the synchronous motor is by means of a power output shaft 22 which has fixed thereto a flywheel 24. The purpose of the flywheel is to assist the motor in maintaining a constant angular velocity. Also connected to the power takeoff shaft 22 may be forward drive and reverse drive pulleys 26 and 28.

The tape capstan comprises a reverse drive shaft 32 which is generally cylindrical in configuration and is rotatably supported on a frame 34 by bearings 36. The exterior wall of the reverse drive shaft is provided with two spaced recesses 38 in which the bearings are located. The purpose of the recess is to constrain the drive shaft again axial movement as it rotates. The reverse drive shaft 32 is hollow in that it has an elongated centrally disposed cylindrical opening 40.

At its end, the drive shaft 32 is provided with a pulley 42 of relatively large diameter that corresponds to above-noted drive pulley 28. The two pulleys are interconnected by a power transmission belt 43 which may be a twisted belt. The twisted belt causes pulleys 42 and 28 to rotate in opposite directions.

At its end remote from pulley 42 the reverse drive shaft is provided with an elongated reduced neck portion 44 that supports an electromagnetic rotor 46. The rotor has an enlarged portion 47 and a necked down portion 48 by which it is fixed to the reverse drive shaft for rotational movement therewith. The rotor is a part of a magnetic clutch which is utilized in driving the tape capstan.

A clutch winding housing is provided. It includes a generally cylindrical member 50 having a radially extending flange 51. The flange 51 connects the clutch winding housing to the aforementioned frame 34 so that it is constrained against axial and rotational movement. Housing 50 supports an appropriately wound brake winding 52 in close proximity to the enlarged portion 47 of the rotor, and also supports an appropriately wound reverse drive winding 53 which is in close proximity to the necked down portion 48 of the rotor.

It should be noted that clutch housing 50 and windings 52 and 53 which it supports are spaced radially from electromagnetic rotor 46 so that while the housing 50 is fixed to the frame, the rotor is free to rotate with the reverse drive shaft. However, the windings are spaced closely enough to the rotor to permit electromagnetic attraction therebetween. The fields generated by the windings preclude their interactions as is well known.

The forward drive system includes a forward drive shaft 56 which is rotatably mounted in the hollow elongated opening 40 in the reverse drive shaft 32. The forward drive shaft includes a large drive pulley 58. A bearing 60 may be provided adjacent the pulley. The bearings may be connected to a suitable portion of frame 34. Pulley 58 which is substantially the same size as pulley 42 is operatively connected to aforementioned pulley 26 by means of a drive belt 82. Thus, pulley 26 and pulley 58 rotate in the same direction while pulleys 28 and 42 rotate in opposite directions, thus causing shaft 32 to rotate in a reverse direction as shaft 56 rotates in a forward direction.

As its end remote from pulley 58 the forward drive shaft has an enlarged cylindrical section 62 which supports a hollow elongated overrunning bearing, or one-way brake 64. The overrunning bearing in turn supports a tape capstan 66. The tape capstan is a generally cylindrical member having a radially extending flange 58 which comprises an armature. The armature 68 is spaced from and cooperates with brake winding 52 and rotor 47 discussed above. Additionally, the capstan includes an annular notch 70 having a plurality of circumferentially spaced and radially directed ports 72 which connect the recess with a suitable source of vacuum for holding the magnetic tape on the capstan.

The capstan and bearing are constrained against axial movement on the enlarged cylindrical end 62 by virtue of oppositely positioned constraining washerlike members 73. Additionally, the forward drive shaft can be supported at the tape capstan end by a bearing 74 which is supported by the frame 34.

Figures 2, 3:
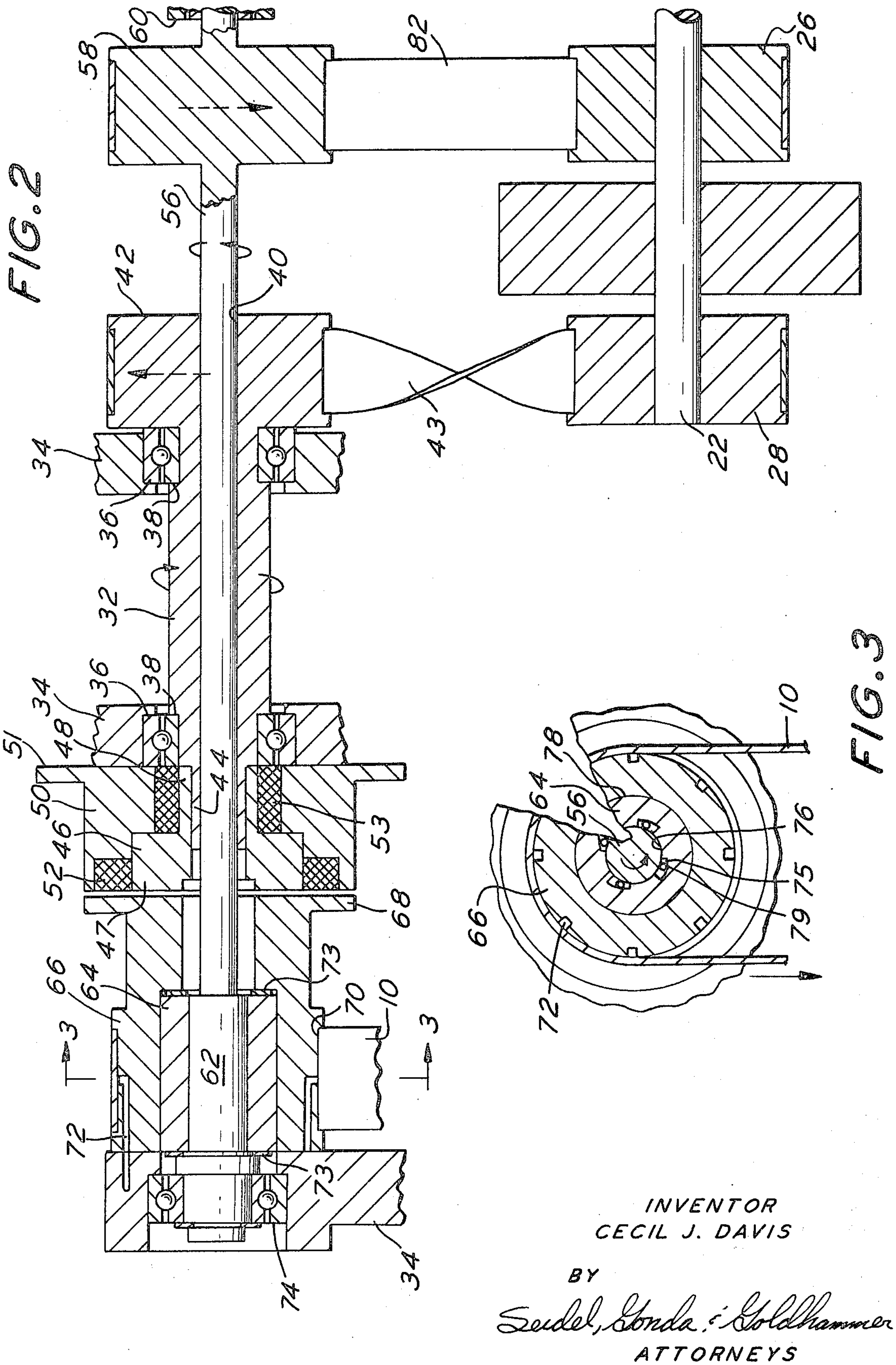
FIG. 2 is a sectional view taken along line 2—2 of FIG. 1.
FIG. 3 is a sectional view taken along line 3—3 of FIG. 2.

Referring now to FIG. 3, the overrunning bearing is preferably of the type that permits the forward drive shaft and the tape capstan to rotate in the same direction. However, it also includes a provision for locking these two members together when the capstan attempts to exceed the speed of the forward drive shaft. Additionally, the overrunning bearing is operative to permit the forward drive shaft and the tape capstan to easily rotate in opposite directions.

Such an overrunning bearing arrangement is illustrated in FIG. 3 wherein it can be seen that the forward drive shaft 56 and the overrunning bearing 64 are arranged to permit relative motion therebetween. The interface 76 between the forward drive shaft and the overrunning bearing may include a suitable roller and recess arrangement such as that illustrated to provide the one-way action. As illustrated schematically for purposes of illustration and not by way of limitation, the recess 75 is generally triangular shaped and supports balls or rollers 79.

Additionally, it should be noted that the capstan 66 is fixed to the overrunning bearing at the interface 78 therebetween so that the capstan and the bearing are locked together for rotational movement. As will be explained more fully herein, the relationship between the capstan 66, overrunning bearing 64 and forward drive shaft 56 provide an arrangement that permits the forward speed of the magnetic tape to be carefully controlled so that it never exceeds the speed of the forward drive shaft while it may remain stationary relative thereto. Additionally, the arrangement of the housing 50 and windings 52 and 53, and their relationship to the electromagnetic rotor 47 and the capstan armature 68 permit the capstan to be driven in a reverse direction at the same speed as the reverse drive shaft. It should be appreciated that both the forward and reverse drive shafts are rotating in opposite directions simultaneously by virtue of the fact that they are interconnected with the synchronous motor by belts 43 and 82.

FIG. 4 which is a schematic diagram of an electrical circuit suitable for operating the capstan comprises a source of electromotive energy 82 which is connected to the synchronous motor 18, the brake winding 52 and the reverse drive winding 53 in parallel by lines 84 and 85. Motor 18 is connected across lines 84 and 85 on a branch 87 and may be selectively energized by a suitable switch 89. The reverse drive winding and the brake winding are connected across lines 84 and 85 by suitable branch circuits 91 and 92. A three-position switch 94 is operative to selectively energize either of the two windings noted above. The switch has three contacts, A, B, and C. When the switch is in the A position, brake winding 52 is energized. When it is in the B position, the brake winding is deenergized and the reverse drive winding is energized. Additionally, when it is connected to point C, neither the brake nor the reverse drive winding are energized.

To utilize the device, a magnetic tape 10 which is to be played or recorded on in inserted in recess 70 in the capstan and is positioned so that buffer loops are formed as illustrated in FIG. 1.

Apertures 72 which are connected to a suitable source of vacuum hold the magnetic tape against sliding rotational movement on the capstan. When switch 89 is closed the synchronous motor begins to rotate, thus driving the forward and reverse drive belts and the forward and reverse drive shafts. Since the reverse drive shaft is connected to the synchronous motor by twisted belt 43, its rotation is at the same velocity as the forward drive shaft, yet in an opposite direction. The vacuum created by vacuum source 17 tends to urge the tape in a forward direction. However, the movement of the tape can be stopped by energizing brake winding 52. Brake winding 52, when energized, acts in cooperation with armature 68 to constrain it against rotational movement, thus preventing the capstan from rotating. Although the capstan and tape are not moving, the forward drive shaft is still rotating. When the brake winding 52 is deenergized as by moving switch 94 from contact A to contact C, the tape capstan, under the influence of the tape which is being urged forwardly by virtue of the differential vacuum in chambers 15 and 16 begins to rotate in the direction illustrated in FIG. 3. The tape causes the capstan to accelerate up to the velocity of the forward drive shaft 56. Since the overrunning bearing is fixed to the tape capstan, when the capstan attempts to exceed the velocity of the forward drive shaft, the rollers and recesses 75 and 79 act to lock the capstan to the forward drive shaft. This action effectively precludes the tape capstan from exceeding the velocity of the forward drive shaft.

Thus, rather than being a source of forward motive power for the magnetic tape, the forward drive shaft actually functions as a velocity governor.

In order to drive the tape in the reverse direction, switch 94 is moved to the B contact. This energizes reverse drive winding 53 which cooperates with rotor 46. The electromagnetic rotor 46, which has been spinning with the reverse drive shaft since switch 89 was closed, cooperates with armature 68 on the tape capstan to rotate the capstan in the same direction as the reverse drive shaft.

Since the tape tension caused by the differential vacuum is only a few ounces it is easily overcome during reverse drive. The overrunning bearing permits this reverse rotation since by an inspection of FIG. 3, it can be seen that when the tape capstan runs counter to the direction of the forward drive shaft, the rollers are driven to the deep portion of their recesses where they offer no obstacle to the rotation.

It at any time, whether the tape is going in a forward direction or a reverse direction, it is desired to stop the tape, then it is merely necessary to move the switch 94 to contact A to energize the brake winding. This will effectively bring the capstan to a halt and the tape therewith. Thus, in the reverse direction, the reverse drive shaft is operative to drive the tape, this being in distinction to the function of the forward drive shaft.

It should be noted that the overrunning bearing could take many different forms such as that of a single direction wrap spring clutch, a spring-loaded clutch, or any other suitable drive that allows motion in one direction but not the other. Additionally, it should be noted that the capstan need not stop in order to go from a forward direction to a reverse direction but may be reversed by merely energizing the rotor 46 and bypassing the brake winding. The effect of this will be to first de-accelerate the forward turning capstan to zero velocity and then accelerate it in a reverse direction under the influence of the turning rotor 46.

Additionally, while the invention has been described in the context of utilizing the vacuum for forward tape drive and the clutch arrangement for reverse tape drive, it is apparent that these relationships can be reversed and are not critical to the operation of the single drive capstan since either technique can be used to drive the tape in a first direction with the other technique being employed to drive the tape in the second direction.

While the invention has been described with particular reference to one embodiment thereof, it should be apparent that many other embodiments or forms of this invention will be obvious to those skilled in the art in the light of the foregoing specification. Accordingly, the scope of the invention should not be limited by the foregoing disclosure, but rather only by the scope of the claims appended hereto.

I claim:

1. Means for driving intelligence bearing tape comprising supply means and tape up means, first and second vacuum chambers disposed intermediate said supply means and said take up means and having unequal vacuums to drive said tape in a first direction, a tape capstan disposed intermediate said first and second chambers, said tape capstan being operative to limit the velocity of said tape in said first direction and to drive the tape in a second direction, said drive in said second direction being against the force created by said unequal vacuums.

2. Means as defined in claim 1 wherein said tape capstan comprises first drive shaft means mounted for rotation in said first direction, second drive shaft means mounted for rotation in said second direction, said tape capstan including means operable to limit the speed of rotation of said tape capstan to the speed of rotation of said first drive shaft means when they rotate in the same direction, and couplable means fixed to said second drive shaft means for rotation therewith, and means for selectively coupling said second drive shaft means and said tape capstan means to drive said tape capstan means in the same direction as said second drive shaft means.

3. Means as defined in claim 2 including a frame, said second drive shaft means being connected to said frame for rotation in said second direction, and said second drive shaft means is coaxial with said first drive shaft means and rotatably supports said first drive shaft means.

4. A tape capstan comprising a frame, first drive shaft means mounted for rotation in a first direction, second drive shaft means mounted to said frame for rotation in a second direction, second drive shaft means being coaxial with said first drive shaft means and rotatably supporting said first drive shaft means, said tape capstan including means operable to limit the speed of rotation of said tape capstan to the speed of rotation of said first drive shaft means when they rotate in the same direction, and couplable means fixed to said second drive shaft means for rotation therewith, and means for selectively coupling said second drive shaft means and said tape capstan means to drive said tape capstan means in the same direction as said second drive shaft means.

5. A device as defined in claim 4 wherein said couplable means is an energizable rotor, said energizable rotor engaging said tape capstan means for rotation therewith so that said tape capstan rotates in said second direction.

6. A device as defined in claim 5 including an energizable brake mounted on said frame, said brake being engagable with said tape capstan means for restraining its rotation.

7. A device as defined in claim 6 including a power source, first coupling means for coupling said power source to said first drive shaft means, second coupling means for coupling said power source to said second drive shaft means, and one of said coupling means including means for driving one of said drive shafts in a direction opposite the other.

8. A device as defined in claim 7 wherein said power source is a rotating member and said first and second coupling means comprise belts, each of said belts engaging said rotating member and one of said drive shaft means, and one of said belts is twisted to cause said rotation of said drive shaft means in opposite directions.

9. A device as defined in claim 6 wherein said means operable to limit the speed of rotation of said tape capstan means is one-way braking means for permitting said tape capstan means and said first drive shaft means to rotate in opposite directions.

10. A device as defined in claim 9 including clutch means fixed to said frame and supporting at least two windings, said tape capstan means includes an armature, said armature being in spaced facing relation to said clutch means, one of said winding being operable to energize said rotor so that said one-way brake unlocks and said tape capstan means is driven by said second drive shaft means, and said other winding is operable when energized to stop rotation of said tape capstan means.

* * * * *